United States Patent [19]
Suzuki et al.

[11] Patent Number: 5,495,308
[45] Date of Patent: Feb. 27, 1996

[54] PICTURE-FORMAT SWITCHABLE CAMERA

[75] Inventors: Tatsuya Suzuki, Funabashi; Shunji Matsutani, Akishima; Manabu Ikeda, Machida; Yasuo Yamazaki, Hino; Hiroaki Miyazaki, Tsukui, all of Japan

[73] Assignee: Olympus Optical Co., Ltd., Tokyo, Japan

[21] Appl. No.: 481,214

[22] Filed: Jun. 7, 1995

Related U.S. Application Data

[63] Continuation of Ser. No. 42,986, Apr. 5, 1993, abandoned.

[30] Foreign Application Priority Data

Apr. 6, 1992 [JP] Japan .................................. 4-084065
Feb. 17, 1993 [JP] Japan .................................. 5-028272

[51] Int. Cl.$^6$ ........................ G03B 17/02; G03B 37/00
[52] U.S. Cl. ............................................ 354/159; 354/94
[58] Field of Search ...................................... 354/94, 159

[56] References Cited

U.S. PATENT DOCUMENTS

| | | | |
|---|---|---|---|
| 1,366,876 | 1/1921 | Colter | 354/159 |
| 2,247,104 | 6/1941 | Takács | 354/159 |
| 4,716,427 | 12/1987 | Shyu | 354/159 |
| 5,010,357 | 4/1991 | Misawa | 354/159 |
| 5,066,971 | 11/1991 | Kodaira | 354/159 |
| 5,086,311 | 2/1992 | Naka et al. | 354/195.1 |
| 5,307,111 | 4/1994 | Kurei | 354/402 |
| 5,327,183 | 7/1994 | Kurei | 354/129 |
| 5,331,363 | 7/1994 | Fridman | 354/159 |

Primary Examiner—Michael L. Gellner
Assistant Examiner—Eddie C. Lee
Attorney, Agent, or Firm—Louis Weinstein

[57] ABSTRACT

A picture-format switchable camera having a picture-format setting device for setting a picture format, and a picture-format switching device for switching to the picture format set by the picture-format setting device from another picture format. The picture-format switching device is disposed between the aperture of a camera body and the light-sensitive surface of a film.

10 Claims, 7 Drawing Sheets

PICTURE-FORMAT SWITCHABLE CAMERA

This is a continuation of application Ser. No. 08/042,986, filed Apr. 5, 1993, now abandoned.

BACKGROUND OF THE INVENTION

1. Field of the Invention

The present invention relates to a camera capable of switching from one of a plurality of picture formats to another so that pictures of various formats can be taken.

2. Related Art Statement

There have been various proposals for cameras enabling pictures to be taken by using Japanese Industrial Standards (JIS) 135 films in such a manner that the picture format of an image surface can be switched between a normal format (24 mm×36 mm) and a panoramic format (e.g., 13 mm×36 mm). The present applicant has also proposed, in Japanese Patent Application No. 3-155, a mechanism for switching the picture format between the normal format and a panoramic format. This mechanism includes a mask provided between the aperture of the camera body and the photographic lens. The mask is driven by a ring connected to an operating member to effect switching between the normal format and a panoramic format.

With the art shown in Japanese Patent Application No. 3-155, since the mask is provided between the aperture of the camera body and the photographic lens, when the lens barrel is collapsed, the photographic lens, etc. cannot be positioned in the vicinity of the aperture of the camera body. Thus, the overall camera is bulky, Moreover, the degree of freedom of design cannot be said to be excellent.

With the above art, since the distance between the light-sensitive surface of the film and the mask is relatively great, the boundaries between light-exposed portions and non-light-exposed portions of the film may not be sharp enough for some users. When the above art is applied to a focal-length adjustable camera, since the angle of incidence on the film surface may vary in accordance with changes in the focal length, a picture taken with a panoramic format may have a vertical dimension varying in accordance with the focal length.

OBJECTS AND SUMMARY OF THE INVENTION

A first object of the present invention is to provide a picture-format switchable camera capable of providing an increased space for a collapsed lens barrel, and capable of providing sharp boundaries between light-exposed and non-light-exposed portions on a film.

A second object of the present invention is to provide a picture-format switchable camera capable of preventing the vertical dimension of picture formats from varying even when the focal length is changed.

To summarize, a picture-format switchable camera according to the present invention comprises: picture-format setting means for setting a picture format; and picture-format switching means for switching to the picture format set by the picture-format setting means from another picture format, the picture-format switching means being disposed between the aperture of a body of the camera and the light-sensitive surface of a film.

These, as well as others objects and advantages of the present invention will become further apparent from the following detailed explanation.

DETAILED DESCRIPTION OF THE PREFERRED EMBODIMENTS

Embodiments of the present invention will now be described with reference to the drawings.

Figure 1:
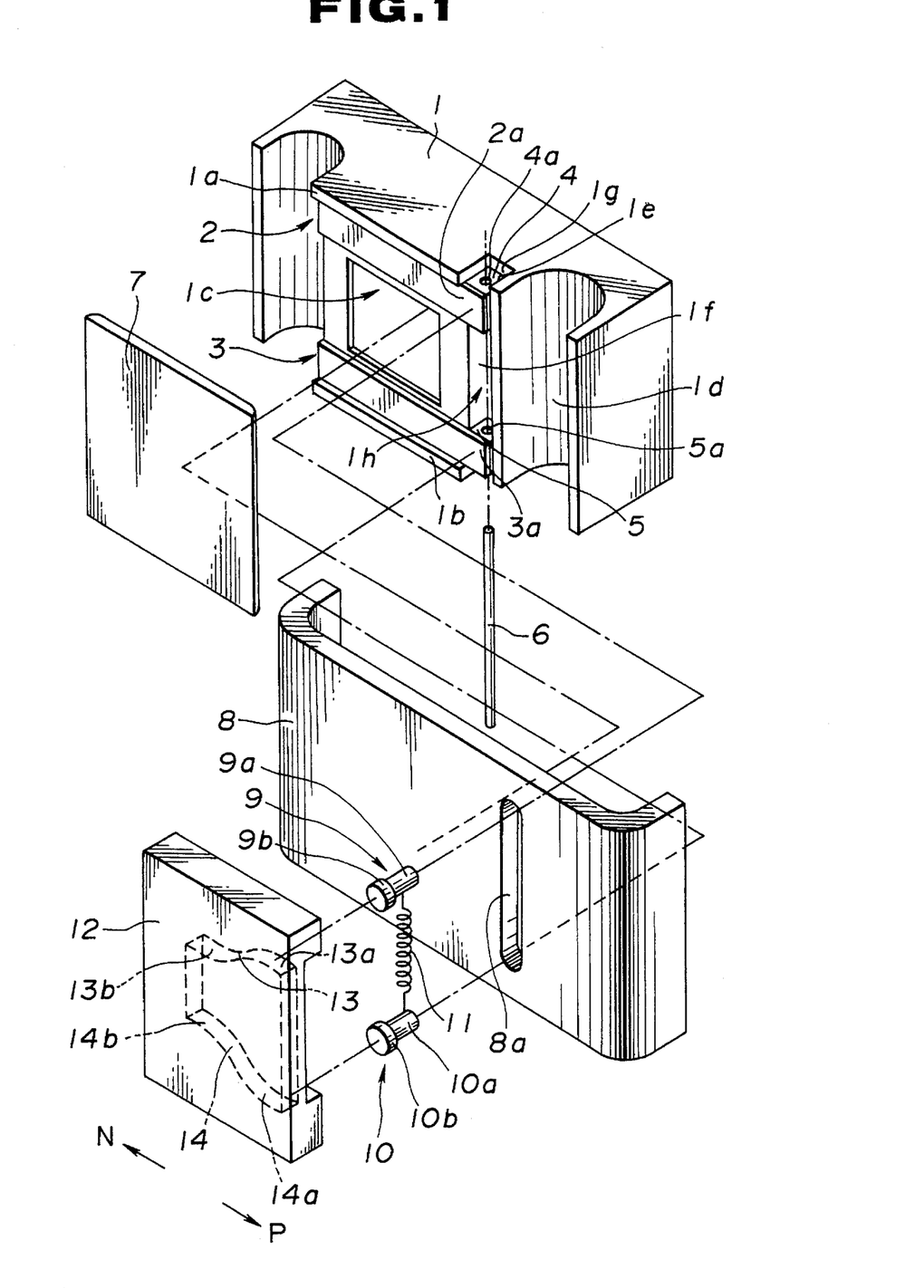
FIG. 1 is an exploded perspective view of the essential parts of a picture-format switchable camera according to a first embodiment of the present invention.

FIG. 1 shows, in an exploded perspective view, the essential parts of a picture-format switchable camera according to a first embodiment of the present invention.

Referring to the drawing, the camera includes a body 1. Upper and lower portions on the rear side of the body 1 constitute a pair of rail surfaces 1a and 1b for a film pressure plate 7. A rear cover 8 is provided on the rear side of the body 1 in such a manner as to be capable of opening and closing. When the rear cover 8 is closed with the film pressure plate 7 positioned in the center of the rear cover 8, the rail surfaces 1a and 1b of the body 1 press on the mated surfaces of the film pressure plate 7 so as to guide a portion of a loaded film 21 (see FIGS. 2(a) and 2(b)) being fed between the rail surfaces 1a and 1b. An aperture 1c for determining an angle of view with which an image is formed on a portion of the loaded film 21 is formed in a central portion of the camera body 1 behind a photographic lens (not shown) of the camera.

Wall surfaces 1e, 1f and 1g of the body 1 located on a first side of the aperture 1c close to a film-winding chamber 1d define a guide groove 1h extending vertically and opening rearward. A pair of mask supporting members 4 and 5, made of a magnetic material and having the same size and the same shape, are slidably received in the guide groove 1h at vertically different positions. The mask supporting members 4 and 5 have vertically-extending through holes 4a and 5a coaxially formed through central portions of the supporting members 4 and 5, respectively. A guide shaft 6 extends vertically with its ends through the through holes 4a and 5a so that the mask supporting members 4 and 5 are vertically slidable along the same plane.

A pair of mask members 2 and 3, each consisting of a relatively thin rectangular member extending in a width direction of the camera body 1, are respectively disposed at upper and lower positions of the space between the rail surfaces 1a and 1b of the body 1. These mask members 2 and 3 are capable of moving vertically along a common plane parallel with the plane defined by the body having aperture 1c, and capable of masking upper and lower edge portions of the aperture 1c, respectively. The mask members 2 and 3 are disposed for vertical movement within the gap between the aperture 1c of the body 1 and a light-sensitive surface of the loaded film 21. Specifically, first end portions 2a and 3a of the mask members 2 and 3 corresponding to the first side of the aperture 1c have reverse surfaces, as viewed in FIG. 1, that is, forward surfaces directed toward the front of the camera body 1. These forward surfaces of the mask members 2 and 3 at the end portions 2a and 3a are respectively secured to contact surfaces of the mask supporting members 4 and 5 having the same shape as the forward surfaces, so that the mask members 2 and 3 vertically move when the mask supporting members 4 and 5 vertically slide in the guide groove 1h.

The openable and closable rear cover 8 provided for covering the rear side of the camera body 1 has a vertically elongated guide bore 8a formed therein at a position corresponding to the path of movement of the mask supporting members 4 and 5. A picture-format switching member 12 is disposed on the outer (i.e., rear) surface of the rear cover 8 in such a manner as to be slidable on the outer surface in directions (indicated by arrows N and P in FIG. 1) parallel with the film feeding direction. The picture-format switching member 12 is operable in response to an operation of a picture-format switching operating member, not shown, such as a picture-format switching button. The picture-format switching member 12 has a protrusion on a central portion of the forward surface thereof, the protrusion having a pair of vertically opposed cam surfaces 13 and 14. The cam surface 13 has an S-shaped contour rising toward the right-hand side of the member 12 (see FIG. 1), and includes a shoulder portion 13a and a bottom portion 13b. The cam surface 14, which is below the other cam surface 13, has an S-shaped contour falling toward the right-hand side of the member 12, and includes a bottom portion 14a and a shoulder portion 14b.

A pair of magnets 9 and 10, each having a large diameter portion and a small diameter portion, are urged toward each other by a coil spring 11 disposed between the respective small diameter portions 9a and 10a of the magnets 9 and 10. Large diameter or "head" portions 9b and 10b of the magnets 9 and 10 are disposed in contact with the cam surfaces 13 and 14, respectively, while the small diameter portions 9a and 10a are fit through the elongated guide bore 8a in such a manner as to be slidable vertically. The small diameter portions 9a and 10a of the magnets 9 and 10 have their forward end faces so positioned as to magnetically connect with the mask supporting members 4 and 5 made of a magnetic material, respectively, through the film pressure plate 7, the film 21 and the mask members 2 and 3.

When the picture-format switching member 12 slides in the direction of arrow N or P, the S-shaped contours of the cam surfaces 13 and 14 cause the magnets 9 and 10 to slide vertically in the elongated guide bore 8a while being guided thereby so that the mask supporting members 4 and 5, magnetically connected with the corresponding magnets 9 and 10, move vertically in unison with the movement of the magnets 9 and 10. The movement of the mask supporting members 4 and 5 causes the mask members 2 and 3 to move vertically, thereby changing the degree of masking of the aperture 1c.

The operation of the picture-format switchable camera according the first embodiment will be described with reference to FIGS. 2(a), 2(b), 3(a) and 3(b).

Figure 2A:
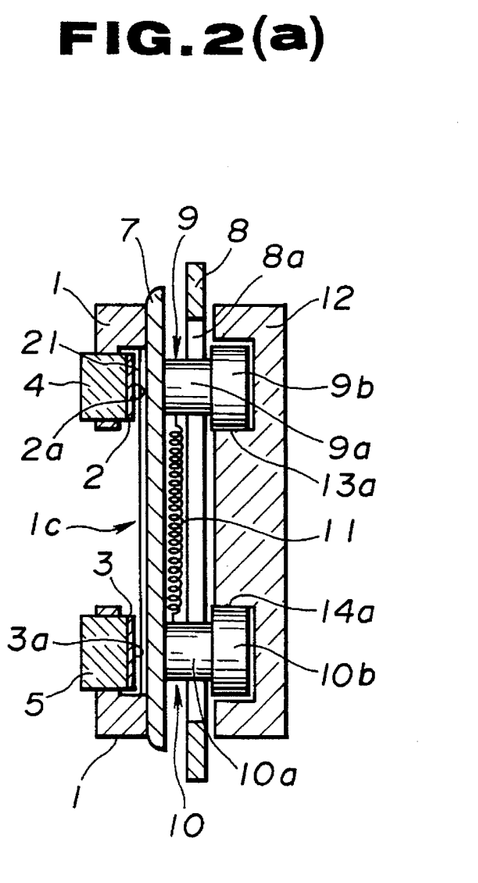
FIGS. 2(a) and 2(b) are enlarged side sectional views of the relevant parts of the first embodiment, showing mask members and a picture-format switching member of the camera together with the periphery of these members.
Figure 2B:
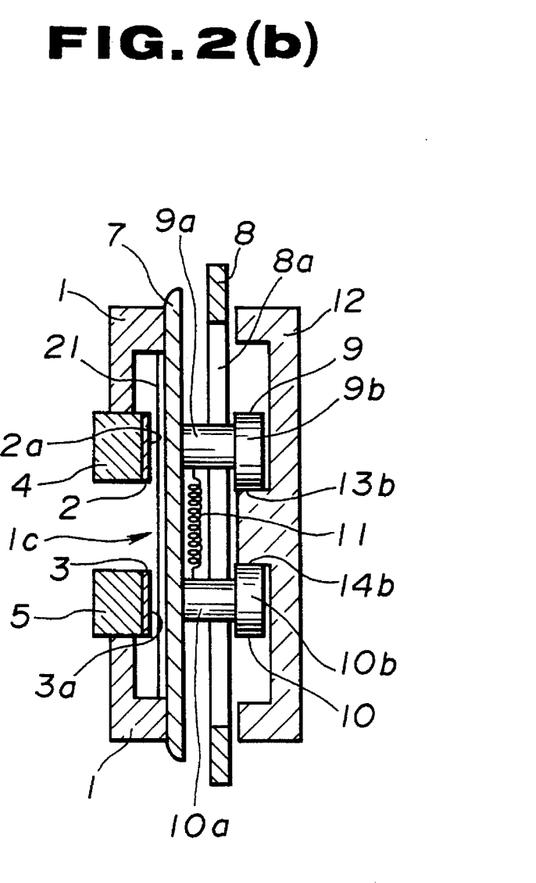
Figure 3A:
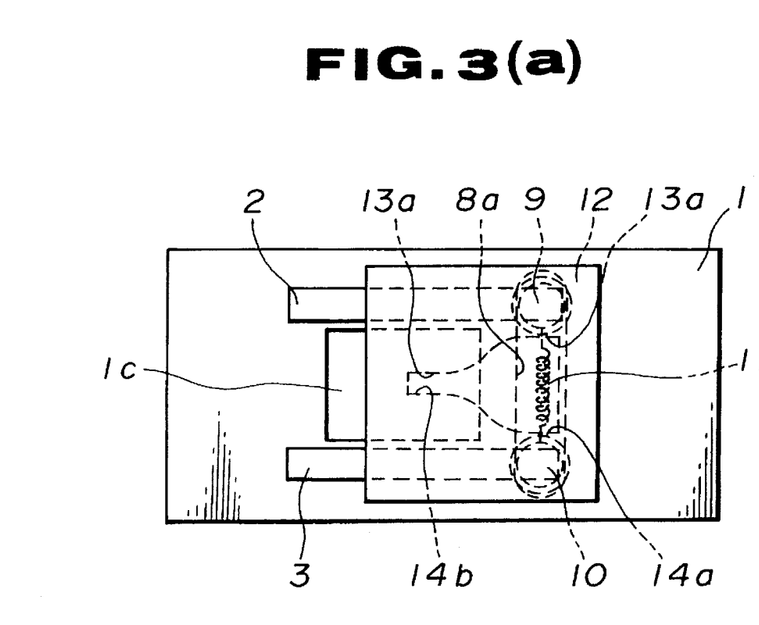
FIGS. 3(a) and 3(b) are enlarged rear elevation views of the relevant parts of the first embodiment, showing the mask members, the picture-format switching member and the periphery of these members.
Figure 3B:
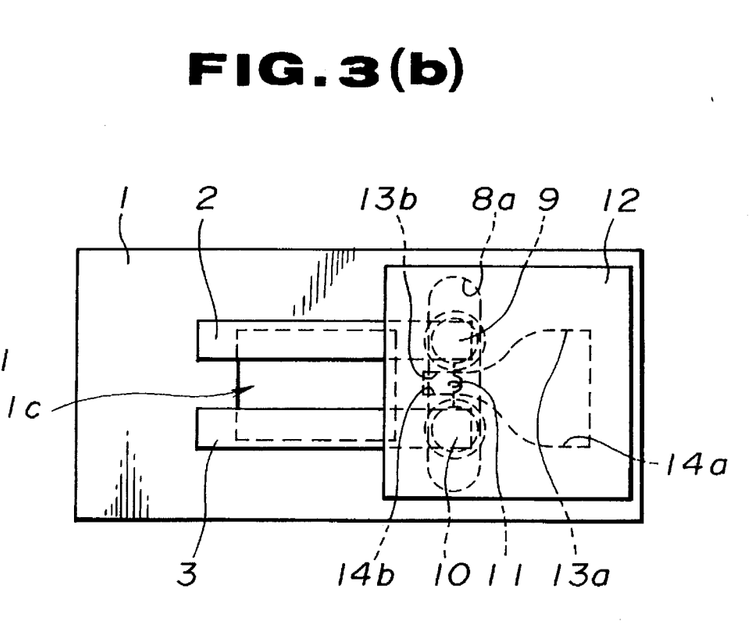

FIGS. 2(a) and 2(b) and FIGS. 3(a) and 3(b) are enlarged side sectional views and enlarged rear elevation views, respectively, showing the mask members 2 and 3 and the picture-format switching member 12 of the camera according to the first embodiment together with the periphery of these members. FIG. 2(a) and FIG. 3(a) show a condition during photographing with a normal format (24 mm×36 mm), and FIG. 2(b) and 3(b) show a condition during photographing with a panoramic format.

Referring to these drawings, a portion of the film 21, loaded in the camera body 1, is fed to a position between the mask members 2 and 3 and the film pressure plate 7. When a switching to the normal format is necessary to take a picture or pictures with this format, the operating member is suitably operated to cause the picture-format switching member 12 to slide in the direction indicated by arrow N in FIG. 1. As a result, the heads 9b and 10b of magnets 9 and 10, pressed on the corresponding cam surfaces 13 and 14 (see FIG. 1) of the picture-format switching member 12 by the urging force of the coil spring 11, are moved away from each other against the urging force to positions along the cam surface portions 13a and 14a, respectively. In this process, the magnet 9 moves upward, and the magnet 10 moves downward. As the magnets 9 and 10 thus move, the mask supporting members 4 and 5, magnetically connected to the corresponding magnets 9 and 10, slide in the guide groove 1h upward and downward, respectively, causing the mask members 2 and 3, partially integrated to the corresponding mask supporting members 4 and 5, to move upward and downward, respectively, whereby the mask members 2 and 3 are retracted to the outside of the aperture 1c, as shown in FIGS. 2(a) and 3(a). In this condition, the aperture 1c is fully opened (i.e. has a full opening area), enabling photographing with the normal format.

On the other hand, switching to a panoramic format when it is necessary to take a picture with this format, the operating member is suitably operated to cause the picture-format switching member 12 to slide in the direction indicated by arrow P. As a result, the magnets 9 and 10 are returned to positions along the cam surface portions 13b and 14b, respectively, by the urging force of the coil spring 11, the magnet 9 returning by moving downward and the magnet 10 returning by moving upward. The mask supporting members 4 and 5, magnetically connected to the corresponding magnets 9 and 10, slide in the guide groove 1h downward and upward, respectively, in unison with the movement of the corresponding magnets 9 and 10. The sliding of the mask supporting members 4 and 5 causes the corresponding mask members 2 and 3 to move downward and upward, respectively, to positions at which the mask members 2 and 3 respectively mask upper and lower edge portions of the aperture 1c, as shown in FIGS. 2(b) and 3(b). In this condition, therefore, upper and lower edge portions of an image surface of the film 21 are masked, enabling a picture of a panoramic format to be taken.

In the foregoing first embodiment, the picture format of an image surface is switched by moving the mask members 2 and 3 to mask or unmask a part of the aperture 1c. However, the camera body 1 may be divided from certain locations thereof into a plurality of sections, some of the sections being able to provide a function similar to that of the mask members 2 and 3 and the section formed with the aperture being able to move. Further, although in the first embodiment, descriptions have been given of switching between a normal format and a panoramic format, this is a mere example, and the embodiment is not intended to be limited thereto. The embodiment may be applied to a mechanism for switching between, for example, a normal format and a half-frame format, or a normal format and a format larger than the normal format.

Next, a second embodiment of the present invention will be described.

Figure 4:
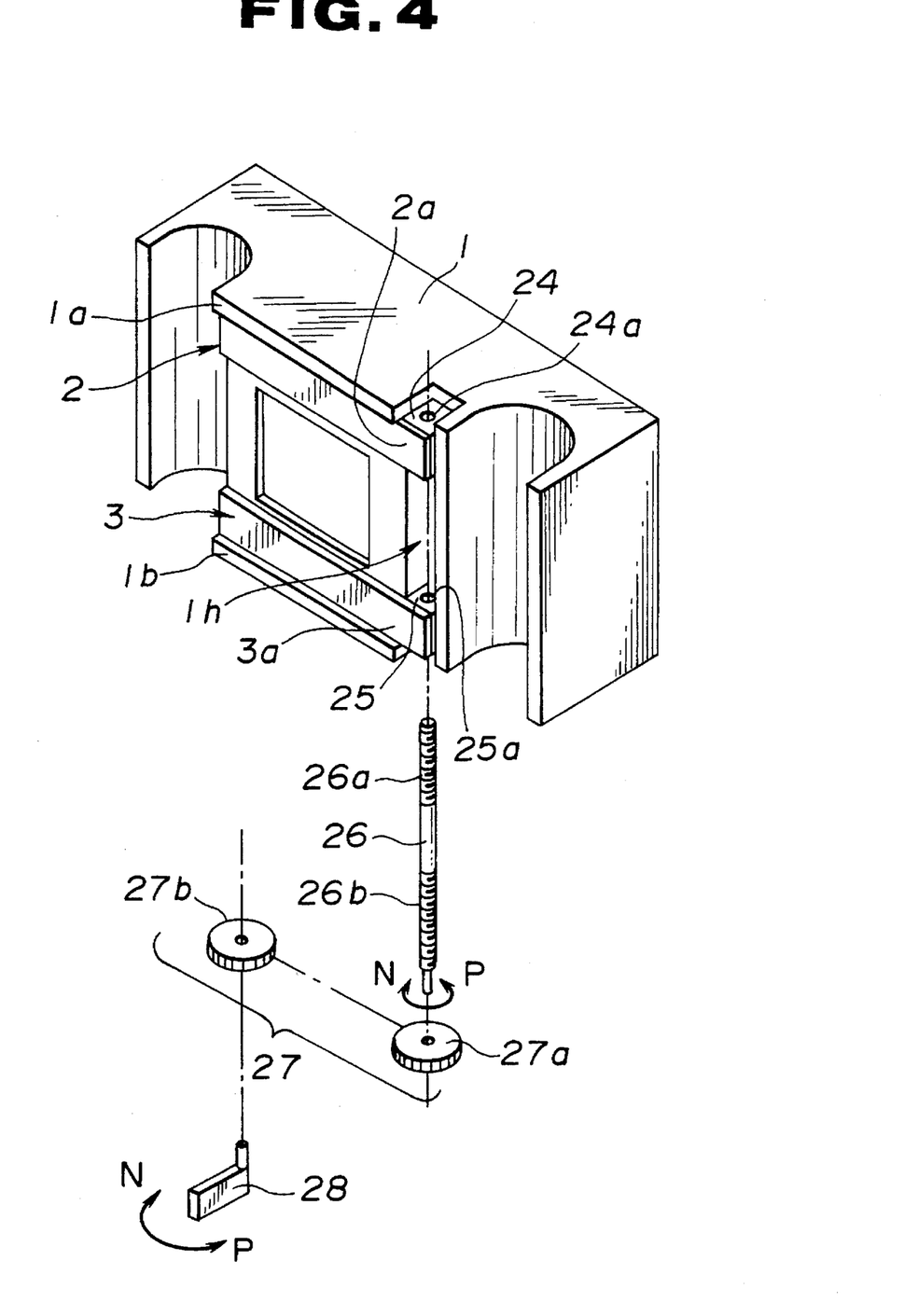
FIG. 4 is an exploded perspective view of the essential parts of a picture-format switchable camera according to a second embodiment of the present invention.

FIG. 4 shows, in an exploded perspective view, the essential parts of a picture-format switchable camera according to the second embodiment.

In the first embodiment, means for driving the mask members 2 and 3 comprises spatially indirect drive means employing the picture-format switching member 12 and utilizing a magnetic connection between the magnets 9 and 10 and the mask supporting members 4 and 5. In contrast, the second embodiment is distinguished from the first embodiment in that the mask members 2 and 3 are directly driven by an external drive source. The construction of the second embodiment is similar to that of the first embodiment except for the construction described below, and descriptions of similar features of the second embodiment will be omitted to avoid redundancy.

In the second embodiment, mask supporting members 24 and 25, having an outer configuration of substantially the same shape and size as those of the mask supporting members 4 and 5 of the first embodiment, are disposed at positions corresponding to those of the first-embodiment mask supporting members 4 and 5.

The mask supporting members 24 and 25 are, similar to the mask supporting members 4 and 5, integrally secured to the respective first ends 2a and 3a of the mask members 2 and 3, and disposed in the guide groove 1h in such a manner as to be slidable vertically. The mask supporting members 24 and 25 have vertically-extending tapped holes 24a and 25a coaxially formed through central portions of the supporting members 24 and 25, respectively. Screw threads having mutually different relationships between rotation and advancement are formed in the tapped holes 24a and 25a. In the illustrated example, right-hand and left-hand screw threads are formed in the tapped holes 24a and 25a, respectively. In contrast with the mask supporting members 4 and 5 made of a magnetic material, the second-embodiment mask members 24 and 25 do not require any particular limitation of materials.

A feed screw-thread member 26, having right-hand and left-hand threaded portions 26a and 26b respectively corresponding to the screw threads in the tapped holes 24a and 25b of the mask supporting members 24 and 25, extends vertically with the threaded portions 26a and 26b kept in threaded engagement with the tapped holes 24a and 25a, respectively, so that when the feed screw-thread member 26 is rotated, the mask supporting members 24 and 25 slide in mutually opposite vertical directions. Specifically, when the feed screw-thread member 26 rotates in the direction indicated by the associated arrow N in FIG. 4, the mask supporting member 24 slides upward in the guide groove 1h while the mask supporting member 25 slides downward therein. On the other hand, when the feed screw-thread member 26 rotates in the direction indicated by the associated arrow P in FIG. 4, the mask supporting member 24 slides downward while the mask supporting member 25 slides upward.

A gear 27a is integrally fixed to the lower end of the feed screw-thread member 26, and is in meshed engagement with another gear 27b through a gear train 27, the intermediate gears being represented by phantom line 27c for purposes of simplicity. The gear 27b is mounted to a picture-format switching lever 28 in such a manner that the gear 27b can be rotated by a rotation of the picture-format switching lever 28. When the gear 27b is thus rotated, its rotational force is transmitted to the gear 27a through the gear train 27, and then transmitted to the feed screw-thread member 26, causing a rotation thereof.

Figure 5A:
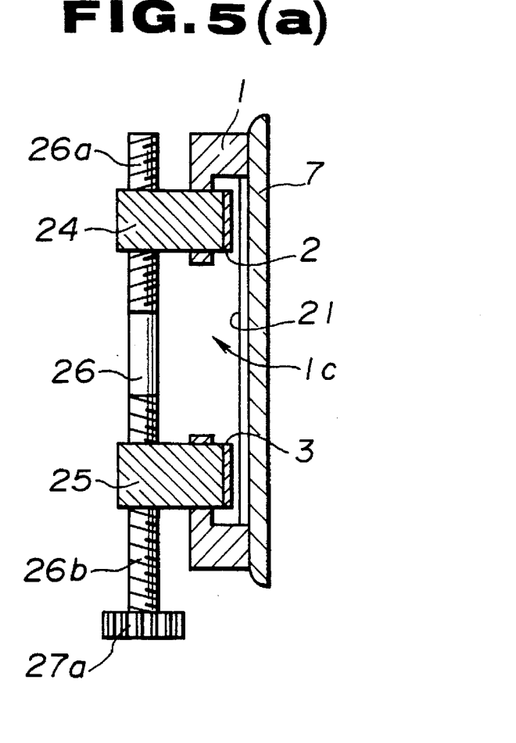
FIGS. 5(a) and 5(b) are enlarged side sectional views of the relevant parts of the second embodiment, showing mask supporting members of the camera together with the periphery of these members.
Figure 5B:
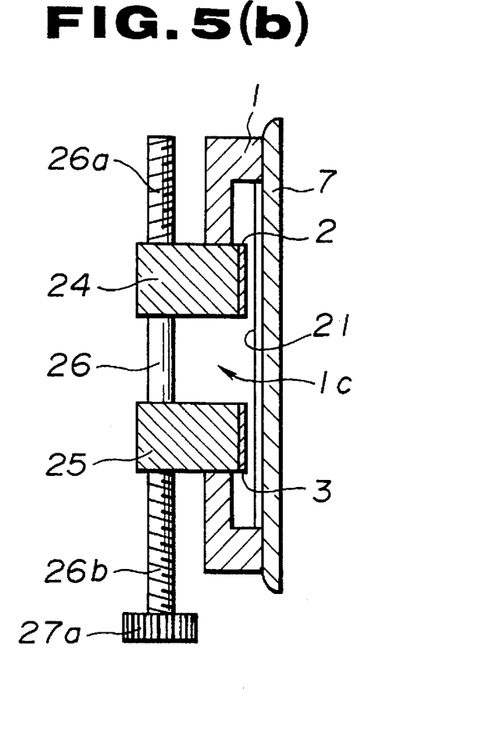
Figure 6A:
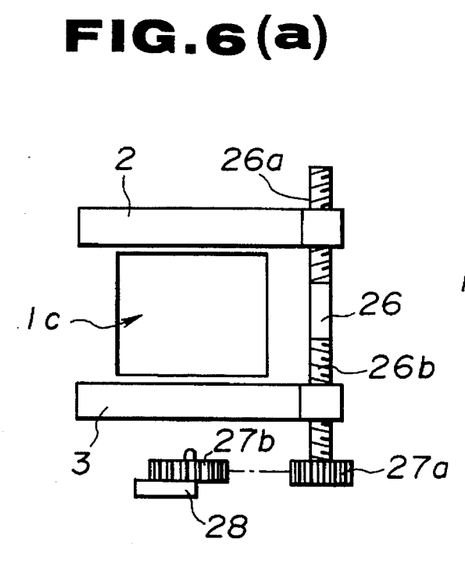
FIGS. 6(a) and 6(b) are enlarged rear elevation views of the relevant parts of the second embodiment, showing the mask supporting members, a picture-format switching lever and the periphery of these members.
Figure 6B:
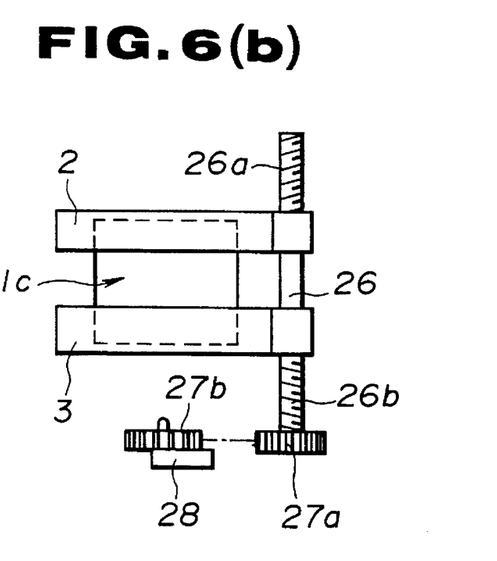

The operation of the second embodiment will be described with reference to FIGS. 5(a) to 6(b). FIGS. 5(a) and 5(b), and FIGS. 6(a) and 6(b) are enlarged side sectional views and enlarged rear elevation views, respectively, showing the mask supporting members 24 and 25 and the feed screw-thread member 26 of the camera according to the second embodiment together with the periphery of these members. FIG. 5(a) and FIG. 6(a) show a condition during photographing with a normal format (24 mm×36 mm), and FIG. 5(b) and 6(b) show a condition during photographing with a panoramic format.

Referring to these drawings, a portion of the film 21, loaded in the camera body 1, is fed to a position between the mask members 2 and 3 and the film pressure plate 7. When a switching to the normal format is necessary to take a picture with this format, the picture-format switching lever 28 is rotated in the direction indicated by the associated arrow N in FIG. 4. The force of this rotation of the picture-format switching lever 28 is transmitted to the gear 27a through the gear 27b and the gear train 27, causing the gear 27a to rotate accordingly. The rotation of the gear 27a causes the feed screw-thread member 26 to rotate in the direction indicated by the associated arrow N in FIG. 4, whereby the mask supporting member 24 is caused to slide upward in the guide groove 1h while the mask supporting member 25 is caused to slide downward therein. The sliding of the mask supporting members 24 and 25 causes the corresponding mask members 2 and 3 to move upward and downward, respectively, thereby retracting to the outside of the aperture 1c, as shown in FIGS. 5(a) and 6(a). In this condition, the aperture 1c is fully opened, enabling photographing with the normal format.

On the other hand, switching to a panoramic format when it is necessary to take a picture with this format, the picture-format switching lever 28 is rotated in the direction indicated by the associated arrow P. The force of this rotation of the picture-format switching lever 28 is transmitted to the gear 27a through the gear 27b and the gear train 27. The rotation of the gear 27a causes the feed screw-thread member 26 to rotate in the direction indicated by the associated arrow P in FIG. 4, whereby the mask supporting member 24 is caused to slide downward in the guide groove 1h while the mask supporting member 25 is caused to slide upward therein. The sliding of the mask supporting members 24 and 25 causes the corresponding mask members 2 and 3 to move downward and upward, respectively, toward the center of the aperture 1c. Thus, the mask members 2 and 3 are brought to a position thereof at which these members respectively mask upper and lower edge portions of the aperture 1c, as shown in FIGS. 5(b) and 6(b). In this condition, photographing with a panoramic format is possible. At this time, if the picture-format switching lever 28 is fixed at a corresponding position thereof by a toggle mechanism, a click mechanism or the like, not shown, picture-taking with the panoramic format is possible with the mask members 2 and 3 being fixed at their panoramic picture-format position.

In the second embodiment, the relationship between the vertically opposed (i.e., upper and lower) positions and the different types of screw threads (i.e., right- and left-hand screw threads) formed on the feed screw-thread member 26 and the mask supporting members 24 and 25 may be the reverse of what described above. With the reverse relationship, the direction of rotation for switching to a normal format and that for switching to a panoramic format will naturally be the reverse of those described above.

Further, although in the above-described example of the second embodiment, the picture-format switching lever 28 is manually rotated, a motor, not shown, may be used to apply a drive force to the gear train 27 so as to drive the feed screw-thread member 26 and control the rotation thereof.

It is possible also in the second embodiment, as in the first embodiment, to divide the camera body 1 from certain locations thereof into a plurality of sections, and to make some of the sections capable of providing a function similar to that of the mask members 2 and 3 while making the section formed with the aperture capable of moving. Further, although the above-described second embodiment shows switching between a normal format and a panoramic format, for the same reason as that stated concerning the first embodiment, the second embodiment may be applied to a mechanism for switching between, for example, a normal format and a half-frame format, or a normal format and a format larger than the normal format.

Next, a third embodiment of the present invention will be described.

Figure 7:
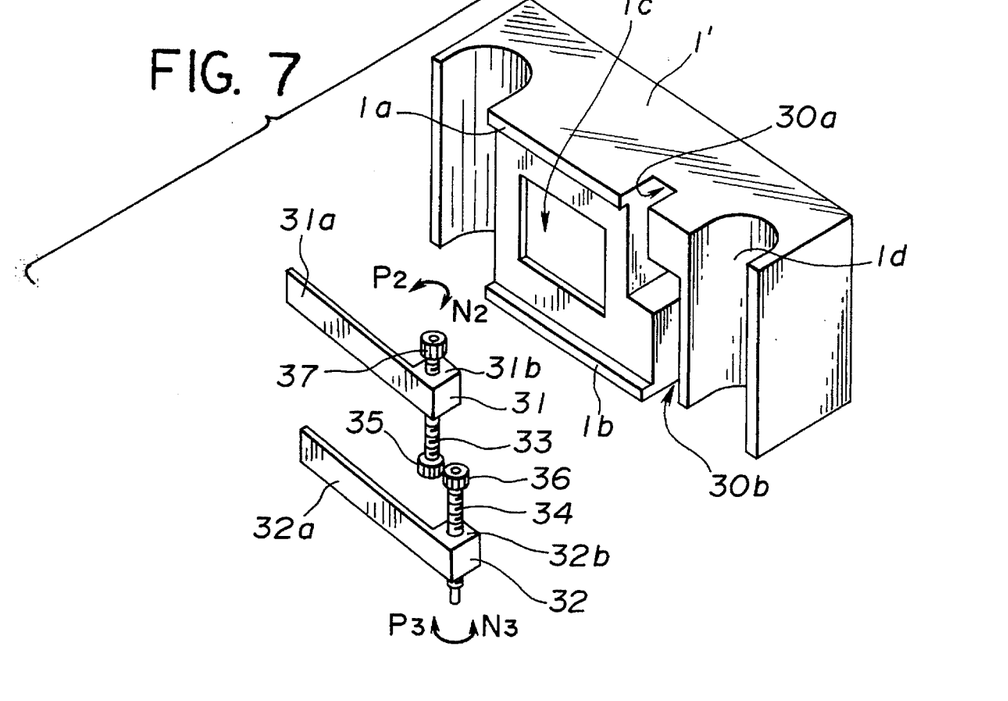
FIG. 7 is an exploded perspective view of the relevant parts of a picture-format switchable camera according to a third embodiment of the present invention.

FIG. 7 shows, in an exploded perspective view, the relevant parts of a picture-frame switchable camera according to a third embodiment.

In contrast with the first embodiment in which means for driving the mask members 2 and 3 comprises spatially indirect drive means employing the picture-format switching member 12 and utilizing a magnetic connection between the magnets 9 and 10 and the mask supporting members 4 and 5, the third embodiment is distinguished from the first embodiment in that masks corresponding to the mask members 2 and 3 are directly driven by an external drive source, as in the second embodiment. The construction of the third embodiment is similar to that of the first embodiment except for the construction described below, and similar features of the third embodiment will not be described for the same reason as that stated before.

Referring to FIG. 7, a camera body 1' of the third embodiment has substantially the same configuration as the camera body 1 of the first embodiment except that a pair of offset guide grooves 30a and 30b, joined together at a crank-shaped joint, are formed in the camera body 1' at a position corresponding to the position of the guide groove 1h of the first embodiment, that is, a position on the first side of the aperture 1c close to the film-winding chamber 1d.

A pair of mask units 31 and 32 have bodies whose outer configuration has substantially the same shape and size as those of the mask supporting members 4 and 5 of the first embodiment, the bodies constituting supports which are received in the guide grooves 30a and 30b, respectively, in such a manner as to be slidable only in the vertical direction.

Portions of the mask units 31 and 32, each consisting of a relatively thin rectangular portion of the mask unit 31 or 32 which extends across the aperture 1c, constitute masks 31a and 32a respectively disposed at upper and lower positions of the space between the rail surfaces 1a and 1b of the camera body 1'. These masks 31a and 32a are capable of moving vertically on a plane parallel with the plane defined by the aperture 1c, and capable of masking upper and lower edge portions of the aperture 1c, respectively. The masks 31a and 32a are disposed for vertical movement within the gap between the aperture 1c and a light-sensitive surface of a loaded film 21, as in the first embodiment. The masks 31a and 32a vertically move when the bodies of the mask units 31 and 32 vertically slide in the corresponding guide grooves 30a and 30b.

The bodies of the mask units 31 and 32 have threaded inner peripheral surfaces surrounding vertically-extending tapped holes 31b and 32b formed through central portions of the bodies. In contrast with the first-embodiment mask supporting members 4 and 5 made of a magnetic material, the mask units 31 and 32 do not require any particular limitation of materials.

A first feed screw-thread member 33 is disposed in threaded engagement with the tapped hole 31b, and is rotatably supported by the camera body 1' within the guide groove 30a. A pair of gears 37 and 35 are integrally fixed to upper and lower ends of the feed screw-thread member 33, respectively. The gear 37 is in meshed engagement with another gear 38, described later, through a gear train, not shown.

A second feed screw-thread member 34 is disposed in threaded engagement with the other tapped hole 30b, and is rotatably supported by the camera body 1' within the guide groove 30b. A gear 36, meshing with the gear 35, is integrally fixed to the upper end of the feed screw-thread member 34.

The first and second feed screw-thread members 33 and 34, and the associated gears 35, 36 and 37 are all disposed in the pair of guide grooves 30a and 30b having the crank-shaped joint.

In the above-described mechanism of the third embodiment, a rotation of the gear 37 causes the first and second feed screw-thread members 33 and 34 to rotate in mutually opposite directions. These rotations of the feed screw-thread members 33 and 34 in turn cause the corresponding mask units 31 and 32 to move in mutually opposite vertical directions.

Specifically, when the feed screw-thread members 33 and 34 rotate in the directions indicated by the associated arrows N2 and N3, respectively, in FIG. 7, the mask unit 31 moves upward while the mask unit 32 moves downward with their bodies sliding in the corresponding guide grooves 30a and 30b. On the other hand, when the feed screw-thread members 33 and 34 rotate in the directions indicated by the associated arrows P2 and P3, respectively, the mask unit 31 moves downward while the mask unit 32 moves upward with their bodies sliding in the corresponding guide grooves 30a and 30b.

Figure 8:
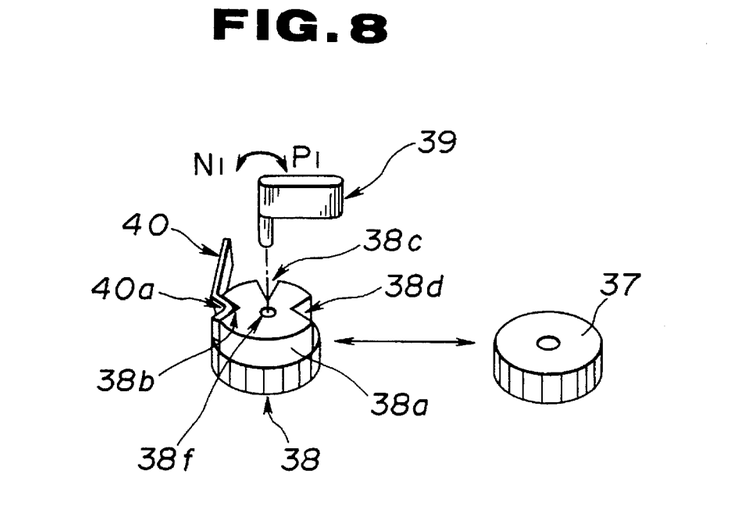
FIG. 8 is an exploded perspective view of the relevant parts of the third embodiment, showing a picture-format setting mechanism of the camera.

FIG. 8 shows, in an exploded perspective view, a picture-format setting mechanism of the third embodiment.

The gear 37 integrally mounted to the upper end of the first feed screw-thread member 33 is meshed with the gear 38 through the gear train, as described before. A wheel 38a, having three notches 38b, 38c and 38d at different positions on a cylindrical side surface thereof, is integrally disposed on the upper surface of the gear 38. A click spring 40 is disposed at a position tangential to the circumference of the wheel 38a, and has an engagement spring portion 40a capable of engaging with one of the notches 38b, 38c and 38d in accordance with a rotation of the wheel 38a. The click spring 40 and the notches 38b, 38c and 38d together constitute a click mechanism.

A picture-format switching lever 39 is integrally mounted to a center shaft 38f of the wheel 38a so that a rotation of the picture-format switching lever 39 causes the wheel 38a to rotate until the wheel 38a is stopped by the click mechanism at a stop position corresponding to one of the notches 38b, 38c and 38d.

When the wheel 38a is thus rotated, its rotational force is transmitted to the gear 37 through the gear train, so that the first and second feed screw-thread members 33 and 34 rotate to cause the mask units 31 and 32 to vertically move to a position corresponding to the stop position of the wheel 38a.

In the third embodiment, the masks 31a and 32a have the same size and shape, the feed screw-thread members 33 and 34 have the same size and shape, and the gears 35, 36 and 47 have the same size and shape.

Figure 9:
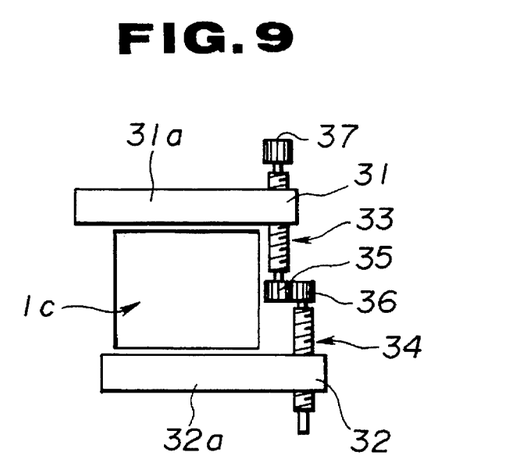
FIG. 9 is an enlarged elevation view of the relevant parts of the third embodiment, showing mask units and feed screw members of the camera together with the periphery of these members during photographing with a normal format.
Figure 10:
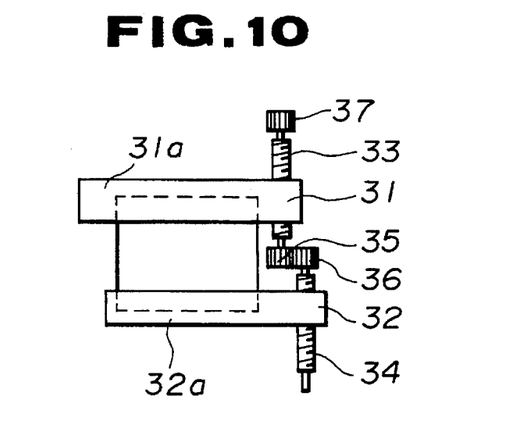
FIG. 10 is an enlarged elevation view of the relevant parts of the third embodiment, showing the mask units, the feed screw members and the periphery of these members during photographing with a semi-panoramic format.
Figure 11:
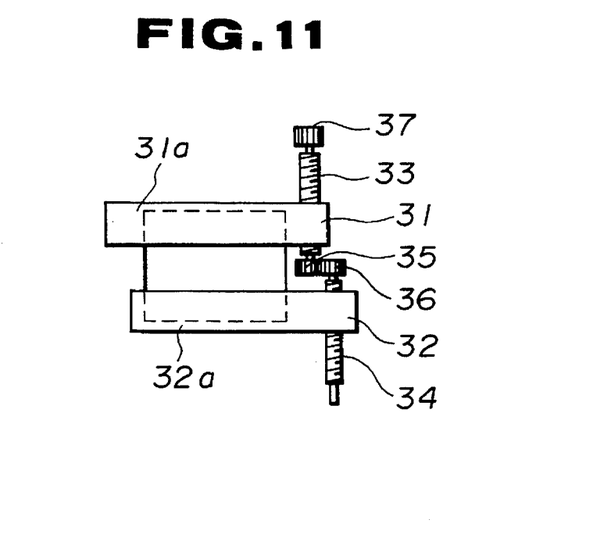
FIG. 11 is an enlarged elevation view of the relevant parts of the third embodiment, showing the mask units, the feed screw members and the periphery of these members during photographing with a panoramic format.

The operation of the third embodiment will be described with reference to FIG. 9 through FIG. 11 FIGS. 9 through 11 show, in enlarged elevations, the mask units 31 and 32, the feed screw-thread members 33 and 34, and their periphery in the camera according to the third embodiment. FIG. 9 shows a condition during photographing with a normal format (24 mm× 36 mm), FIG. 10 shows a condition during photographing with a semi-panoramic format, and FIG. 11 shows a condition during photographing with a panoramic format.

When the picture-format switching lever 39 is rotated in the direction indicated by the associated arrow N1 in FIG. 8, the wheel 38a rotates in the same direction, causing, through the gear train, the gear 37 to rotate in the direction indicated by the associated arrow N2 in FIG. 7. This rotation of the gear 37 causes the first feed screw-thread member 33 to rotate in the same direction so that the associated mask unit 31 moves upward along the guide groove 30a. At the same time, the gear 35 fixed to the lower end of the first feed screw-thread member 33 rotates, causing the gear 36 meshing with the gear 35 to rotate in the direction indicated by the associated arrow N3 in FIG. 7. This rotation of the gear 36 causes the second feed screw-thread member 34 to rotate in the same direction so that the associated mask unit 32 moves downward along the guide groove 30b.

The rotation of the picture-format switching lever 39 in the direction N1 is continued until the engagement portion 40a of the click spring 40 engages with the notch 38d of the wheel 38a, whereupon the rotation of the picture-format switching lever 39 is stopped. In this condition, the masks 31a and 32a are at a first position thereof at which the masks are retracted from the aperture 1c upward and downward, respectively, thereby enabling photographing with the normal format (see FIG. 9).

Thereafter, when the picture-format switching lever 39 is rotated in the direction indicated by the associated arrow P1, the first and second feed screw-thread members 33 and 34 rotate in the directions indicated by the associated arrows P2 and P3, respectively, so that the masks 31a and 32a move downward and upward, respectively. The rotation of the switching lever 39 in the direction P1 is continued until the engagement portion 40a of the click spring 40 engages with the notch 38c of the wheel 38a, whereupon the rotation of the picture-format switching lever 39 is stopped. In this condition, the masks 31a and 32a are at a second position thereof at which the masks respectively mask relatively small upper and lower edge portions of the aperture 1c, thereby enabling photographing with a semi-panoramic format (see FIG. 10). The semi-panoramic format may have a ratio between vertical and lateral dimensions approximating a ratio of a high-definition screen.

Thereafter, when the picture-format switching lever 39 is rotated further in the direction indicated by the associated arrow P1, the first and second feed screw-thread members 33 and 34 rotate further in the directions indicated by the associated arrows P2 and P3, respectively, so that the masks 31a and 32a move further downward and upward, respectively. This rotation of the switching lever 39 to the direction P1 is continued until the engagement portion 40a of the click spring 40 engages with the notch 38b of the wheel 38a, whereupon the rotation of the picture-format switching lever 39 is stopped. In this condition, the masks 31a and 32a are at a third position thereof at which the masks respectively mask relatively large upper and lower edge portions of the aperture 1c, thereby enabling photographing with a panoramic format (see FIG. 11).

The above description concerns the case where switchings to the normal format (first position), to the semi-panoramic format (second position) and to the panoramic format (third position) are sequentially performed. In order to effect switching directly from the normal format to the panoramic format, the user simply rotates the picture-format switching lever 39 beyond the second position to the third position until a click action occurs at the third position after a click at the second position. Thus, the user can take a picture with a desired one of the plurality of picture formats.

Although three different picture formats are available in the above-described third embodiment, this is a mere example, and the embodiment may be applied to a mechanism for switching between, for example, a normal format and a half-frame format, or a normal format and a format larger than the normal format.

Further, although in the above-described example of the third embodiment, the picture-format switching lever 39 is manually rotated, a motor, not shown, may be used to apply a drive force to the gear train so as to drive the feed screw-thread members 33 and 34 and control the rotation thereof.

It is possible also in the third embodiment, as in the first and second embodiments, to divide the camera body 1' from certain locations thereof into a plurality of sections, and to make some of the sections capable of providing a function similar to that of the masks 31a and 32a while making the section formed with the aperture capable of moving.

The third embodiment is advantageous in that some of the components are provided as portions of the same member, thereby reducing production costs.

As has been described above, a picture-format switchable camera according to the present invention is capable of providing an increased space for a collapsed lens barrel, capable of preventing boundaries between light-exposed and non-light-exposed portions on a film from being blurred, and capable of preventing the vertical dimension of picture formats from varying even when the focal length is changed.

In the present invention, it is apparent that working modes different in a wide range can be formed on the basis of the present invention without departing from the spirit and scope of the invention. The present invention is not restricted by any specific embodiment except being limited by the appended claims.

What is claimed is:

1. A picture-format switchable camera comprising:

picture-format setting means for setting a picture format including selecting means for selecting a picture format from an exterior side of said camera body; and picture-format switching means for switching to a picture format set by said picture-format setting means from one picture format to another picture format, said picture-format switching means being disposed adjacent to an aperture in the body of said camera for passing an image from a camera lens to a film plane;

said picture-format switching means comprising a pair of mask members disposed parallel to said image plane, and movable away from and toward each other;

moving means for moving said mask members to a position corresponding to said picture format selected through said selecting means;

said moving means further comprising a pair of mask supporting members each being secured to a first end of one of said mask members close to said aperture, and having mutually different female screw-threads coaxially formed in substantially central portions thereof;

an elongated recess adjacent to the aperture for slidably receiving said mask support members;

a pair of male feed screw-thread means each having an outer end portion in threaded engagement with the female screw-thread of one of said mask supporting means and an inner end portion, said inner end portions being coupled to one another at a position intermediate said mask members;

transmission means for transmitting an amount of switching rotation corresponding to the picture format selected through said selecting means to one of said feed screw-thread means whereby rotation of said transmission means in a first direction moves said mask members closer to one another and rotation of said transmission means in a second direction opposite said first direction moves said mask members further apart; and said recess having a shape conforming to a shape of said mask supporting members to prevent rotation of said mask members while permitting said mask members to move along a path parallel to said elongated recess.

2. A picture-format switchable camera according to claim 1, wherein each of said mask supporting members has at least one flat surface and said recess has a flat surface slidably engaging the flat surfaces of said mask supporting members to prevent rotation of said mask supporting members thereby eliminating a need for a means engaging free ends of said mask members to prevent rotation thereof.

3. A picture-format switchable camera according to claim 2, wherein said flat surface of said recess is parallel to said image plane.

4. A picture-format switchable camera according to claim 2, wherein said flat surface of said recess is perpendicular to said image plane.

5. A picture-format switchable camera according to claim 1, wherein said mask supporting members each have at least first and second flat surfaces and said recess has first and second flat surfaces respectively slidably engaging the first and second flat surfaces of said mask supporting members to prevent rotation of said mask supporting members and said mask members.

6. A format switchable camera according to claim 5, wherein the first and second flat surfaces of said mask supporting members and the first and second flat surfaces of said recess are substantially parallel to one another.

7. A format switchable camera according to claim 1, wherein said mask supporting members are substantially rectangular parallelepiped members having at least two flat parallel surfaces and said recess has two substantially flat side surfaces each engaging one of said parallel surfaces of said parallelelpiped members.

8. A picture-format switchable camera according to claim 1, wherein said pair of male screw-thread means are provided at spaced locations along an elongated cylindrical rod, said rod being positioned to maintain said mask supporting members in sliding engagement with said recess.

9. A picture-format switchable camera comprising:

picture-format setting means for setting a picture format including selecting means for selecting a picture format from an exterior side of said camera body; and picture-format switching means for switching to a picture format set by said picture-format setting means from one picture format to another picture format, said picture-format switching means being disposed adjacent to an aperture in the body of said camera for passing an image from a camera lens to a film plane;

said picture-format switching means comprising a pair of mask members disposed parallel to said image plane, and movable away from and toward each other;

moving means for moving said mask members to a position corresponding to said picture format selected through said selecting means;

said moving means further comprising a pair of mask supporting members each being secured to a first end of one of said mask members close to said aperture, and having mutually different female screw-threads coaxially formed in substantially central portions thereof;

an elongated recess adjacent to the aperture for slidably receiving said mask support members;

rod means having a pair of male feed screw-thread means respectively formed at opposite ends thereof, each of said pair of male feed screw-thread means threadedly engaging respectively with female screw-threads of one of said mask supporting means;

transmission means for transmitting an amount of switching rotation corresponding to the picture format selected through said selecting means to one of said feed screw-thread means whereby rotation of said transmission means in a first direction moves said mask members closer to one another and rotation of said transmission means in a second direction opposite said first direction moves said mask members further apart; and said recess having a shape conforming to a shape of said mask supporting members to prevent rotation of said mask members while permitting said mask members to move along a path parallel to said elongated recess.

10. A picture-format switchable camera comprising:

picture-format setting means for setting a picture format including selecting means for selecting a picture format from an exterior side of said camera body; and picture-format switching means for switching to a picture format set by said picture-format setting means from one picture format to another picture format, said picture-format switching means being disposed adjacent to an aperture in the body of said camera for passing an image from a camera lens to a film plane;

said picture-format switching means comprising a pair of mask members disposed parallel to said image plane, and movable away from and toward each other;

moving means for moving said mask members to a position corresponding to said picture format selected through said selecting means;

said moving means further comprising a pair of mask supporting members each being secured to a first end of one of said mask members close to said aperture, and having mutually different female screw-threads coaxially formed in substantially central portions thereof;

an elongated recess adjacent to the aperture for slidably receiving said mask support members;

a pair of male feed screw-thread means each having an outer end portion in threaded engagement with the female screw-thread of one of said mask supporting means and an inner end portion, said inner end portions being coupled to one another at a position intermediate said mask members;

transmission means for transmitting an amount of switching rotation corresponding to the picture format selected through said selecting means to one of said feed screw-thread means whereby rotation of said transmission means in a first direction moves said mask members closer to one another and rotation of said transmission means in a second direction opposite said first direction moves said mask members further apart; and said recess preventing said mask members from being rotated while said mask members move in a direction substantially parallel to said elongated recess.

* * * * *